(12) United States Patent  
Darthenay

(10) Patent No.: US 9,166,842 B2  
(45) Date of Patent: Oct. 20, 2015

(54) RF REPEATER CIRCUIT

(71) Applicant: NXP B.V., Eindhoven (NL)

(72) Inventor: Frederic Darthenay, Saint Aubin sur Mer (FR)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/134,791

(22) Filed: Dec. 19, 2013

(65) Prior Publication Data

US 2015/0180687 A1  Jun. 25, 2015

(30) Foreign Application Priority Data

Dec. 21, 2012  (EP) .................................... 12290457

(51) Int. Cl.
*H04L 25/20* (2006.01)
*H04L 1/00* (2006.01)

(52) U.S. Cl.
CPC .............. *H04L 25/20* (2013.01); *H04L 1/0076* (2013.01)

(58) Field of Classification Search
CPC .. H04B 3/36; H04B 7/15542; H04B 7/15585; H04B 7/15571; H04L 25/20; H04L 12/44; H04L 12/46; H04L 1/0076
USPC ................... 375/211, 226, 229, 260, 316, 340
See application file for complete search history.

(56) References Cited

U.S. PATENT DOCUMENTS

| | | | |
|---|---|---|---|
| 6,700,388 B1* | 3/2004 | Mayor et al. ................... | 324/537 |
| 2003/0103445 A1* | 6/2003 | Steer et al. ..................... | 370/208 |
| 2003/0114103 A1 | 6/2003 | Dinkel et al. | |
| 2004/0166808 A1* | 8/2004 | Hasegawa et al. ........... | 455/63.4 |
| 2004/0240588 A1* | 12/2004 | Miller ........................... | 375/340 |
| 2007/0092015 A1* | 4/2007 | Hart et al. ..................... | 375/260 |
| 2008/0205323 A1* | 8/2008 | Kaneko et al. ................ | 370/315 |
| 2009/0052404 A1* | 2/2009 | Amalfitano et al. .......... | 370/335 |
| 2009/0290552 A1* | 11/2009 | Bertorelle ..................... | 370/329 |
| 2011/0085477 A1 | 4/2011 | Schiff | |
| 2012/0282855 A1 | 11/2012 | Ku et al. | |
| 2012/0321021 A1* | 12/2012 | Matsumura ................... | 375/340 |

FOREIGN PATENT DOCUMENTS

EP  2 086 138 A1  8/2009

OTHER PUBLICATIONS

Extended European Search Report for Application EP 12290457.6 (Apr. 19, 2013).

* cited by examiner

*Primary Examiner* — Syed Haider

(57) ABSTRACT

RF repeater circuits may be used to regenerate an RF signal. A method and apparatus is described for regenerating a received RF signal the RF signal comprising a plurality of channels, each channel comprising a plurality of channel symbols, the method comprising producing a digitized RF signal from the received RF signal, extracting spectral information of each of the channels from the digitized RF signal, recovering one or more channel symbols from each of the plurality of channels, remodulating the channel symbols, and converting the remodulated channel symbols to an analog signal resulting in a regenerated RF signal.

12 Claims, 5 Drawing Sheets

RF REPEATER CIRCUIT

CROSS-REFERENCE TO RELATED APPLICATIONS

This application claims the priority under 35 U.S.C. §119 of European patent application no. 12290457.6, filed on Dec. 21, 2012, the contents of which are incorporated by reference herein.

This invention relates to radio frequency (RF) repeater circuits for regenerating an RF signal.

RF repeater circuits are used to regenerate an RF signal, which is transmitted over some distance, for example mobile phone signals transmitted over a mobile phone network and Cable TV transmission signals. These RF signals typically include a number of channels of information represented by channel symbols that are modulated onto the RF signal using a number of well-known techniques such as Quadrature Amplitude modulation (QAM), Phase shift keying (PSK) and Orthogonal frequency division multiplexing (OFDM). These channels may, for example, carry voice data for a particular call in the case of a mobile telephone network or the information for a particular TV channel when transmitted along a cable.

US 2003/0114103 A1 describes a repeater system for transmitting and receiving RF signals to and from an area obstructed by a mountain, a building, etc. One antenna is linked to the base station antenna of, for example, a cell in a cellular network, and another antenna is directed to the obstructed area. Signals are received by one antenna from the base station antenna and digitally separated into a number of different frequency channels. The separated channels are then transmitted by the other antenna into the obstructed area to mobile users. Also, signals from the mobile users are received by one of the antennas and similarly digitally separated into different frequency channels and transmitted to the base station antenna for delivery to a communication network.

US 2011/0085477 A1 describes a repeater system for a wireless communication system. The repeater system uses an analog frequency converter and digital down and up converter in order to allow the processing of the repeated signal in a relatively low frequency, in the 30 MHz range, and in a digital rather than in analog form. The repeater system also provides a programmable multi-band filter, which can identify and suppress out of band noises to increase the signal-to-noise ratio of the system. However, the Noise Factor of the channel itself does not improve, since the filtering only suppresses noise occurring at out-of-band frequencies, and not within the channel.

Various aspects of the invention are defined in the accompanying claims. In a first aspect there is defined a radio-frequency (RF) repeater for regenerating a received RF signal, the RF signal comprising a plurality of channels, each channel comprising a plurality of channel symbols, the radio-frequency repeater comprising: an input for receiving the received RF signal, an analog to digital convertor coupled to the input and operable to output a digitized RF signal, a spectrum processor coupled to the analog to digital convertor and operable to extract spectral information of each of the plurality of channels from the digitized RF signal, a channel symbol extraction module coupled to the spectrum processor and operable to recover and extract one or more channel symbols from each of the plurality of channels, a RF signal regenerator coupled to the channel symbol recovery module and operable to remodulate the one or more recovered channel symbols in each of the plurality of channels and output a digitized regenerated RF signal, and a digital to analog convertor coupled to the RF signal regenerator and operable to convert the digitized regenerated RF signal to a regenerated RF signal for transmission.

The full spectrum of a received RF signal may be processed by digitizing the signal using a single high performance wideband ADC, and then by performing full or partial demodulation of the channels, first by spectral processing of the RF signal and extracting the channel symbols from the channels, followed by regenerating the signal by remodulation of the extracted channel symbols and then converting back to an analog RF signal for transmission with a wideband DAC. This results in an improved noise factor for a channel. For a single high-performance wideband ADC which can capture the full bandwidth of the RF signal, the incoming signal may be processed without down-conversion to an intermediate frequency or splitting the signal into a number of channels that are processed in separate signal paths or datapaths through the circuit. In the case of cable TV applications, the signals that can be processed by a single wideband ADC may be in the range of 40 MHz to 1.1 GHz.

Embodiments may also include signal conditioning circuit arranged in the signal path between the input and the analog to digital convertor, the signal conditioning circuit comprising an amplifier coupled to an equalizer.

The amplifier and equalizer can adapt the received RF signal to the input signal range of the analog to digital convertor.

In embodiments the spectrum processor comprises a Fourier transform module which may implement a Discrete Fourier Transform (DFT). The Discrete Fourier Transform may be implemented as a fast Fourier transform algorithm.

In embodiments, the spectrum processor is arranged to process the spectrum of a RF signal comprising a plurality of channels modulated by Quadrature Amplitude Modulation (QAM), Phase Shift Keying (PSK) modulation, or Orthogonal Frequency Division Multiplexing. The spectrum processor may apply a window to the RF signal prior to the Fourier transform operation having a window bandwidth factor of K and the spectrum is processed by adjusting the numbers of points Npts of the Fourier transform according to the relationship:

$$K*(\text{Sample frequency/Npts}) = \text{Channel bandwidth}$$

The window bandwidth factor K may be defined in units of the number of Fourier transform output bins.

In embodiments, the Fourier transform module is operable to apply windowing to the digitized RF signal, wherein the Window Bandwidth is equal to the Channel Bandwidth.

In embodiments, the channel extraction module is operable to calculate the average amplitude and phase of each channel symbol. In embodiments the channel symbol extraction module is further operable to apply a correction to the amplitude and phase of each channel symbol to locate the symbol correctly within a predefined symbol constellation.

The channel extraction allows amplitude and phase errors to be corrected without fully decoding the channel symbols, for example by locating on the QAM symbol constellation, so reducing the in-band channel noise.

In embodiments the RF signal regenerator further comprises a correction module, arranged between an inverse Fourier transform module and the digital to analog convertor, wherein the -correction module is operable to alter the phase and/or amplitude of each channel symbol. The correction module may allow compensation for the track and hold behaviour of the digital to analog conversion.

In some embodiments the spectrum processor is arranged to process the spectrum of a RF signal comprising a plurality of channels modulated by OFDM modulation and the Fourier transform module is operable to apply a FFT operation on each sub carrier of the RF signal.

In embodiments arranged to process OFDM signals, the channel symbol extraction module is operable to extract channel symbols from each of the sub channels of the RF signal.

In embodiments arranged to process QAM or PSK modulated RF signals the RF signal regenerator further comprises a channel relocator operable to set the amplitude and phase of the central frequency and to scale the amplitude of each of the plurality of channels. This equalizes the channels in the regenerated RF signal.

In embodiments arranged to process OFDM signals, the RF signal regenerator further comprises a channel relocator operable to set the amplitude and phase of the central frequency of all sub-carriers.

In embodiments the RF signal regenerator comprises an Inverse Fourier Transform Module.

In embodiments the RF repeater is operable to regenerate an RF signal with a central carrier frequency of at least one of the plurality of channels which is different to the central carrier frequency of the corresponding at least one channel of the received RF signal. The RF signal generator may regenerate an RF signal with channels on different carrier frequencies than the received RF signal. This can be used to improve signal to noise ratio caused by interference on a particular carrier frequency or path propagation characteristics. For example in a cable transmission system there may be more attenuation at some points within the frequency spectrum.

In embodiments the RF signal regenerator may comprise a channel decoder coupled to the channel symbol extraction module, a forward error correction module coupled to the channel decoder, a channel encoder coupled to the forward error correction module and a channel relocator coupled to the channel encoder, wherein the RF signal generator module is further operable to perform error correction on each recovered channel symbol. By adding full channel decoding, error correction and re-encoding, the bit error rate of a repeater may be reduced for each channel in addition to the noise factor.

In a second aspect there is described a method of regenerating a received radio-frequency (RF) signal, the RF signal comprising a plurality of channels, each channel comprising a plurality of channel symbols, the method comprising producing a digitized RF signal from the received RF signal, extracting spectral information of each of the channels from the digitized RF signal, recovering one or more channel symbols from each of the plurality of channels, remodulating the channel symbols, and converting the remodulated channel symbols to an analog signal resulting in a regenerated RF signal.

BRIEF DESCRIPTION OF THE DRAWINGS

Embodiments of the invention are now described in detail, by way of example only, illustrated by the accompanying drawings in which.

DETAILED DESCRIPTION

Figure 1:
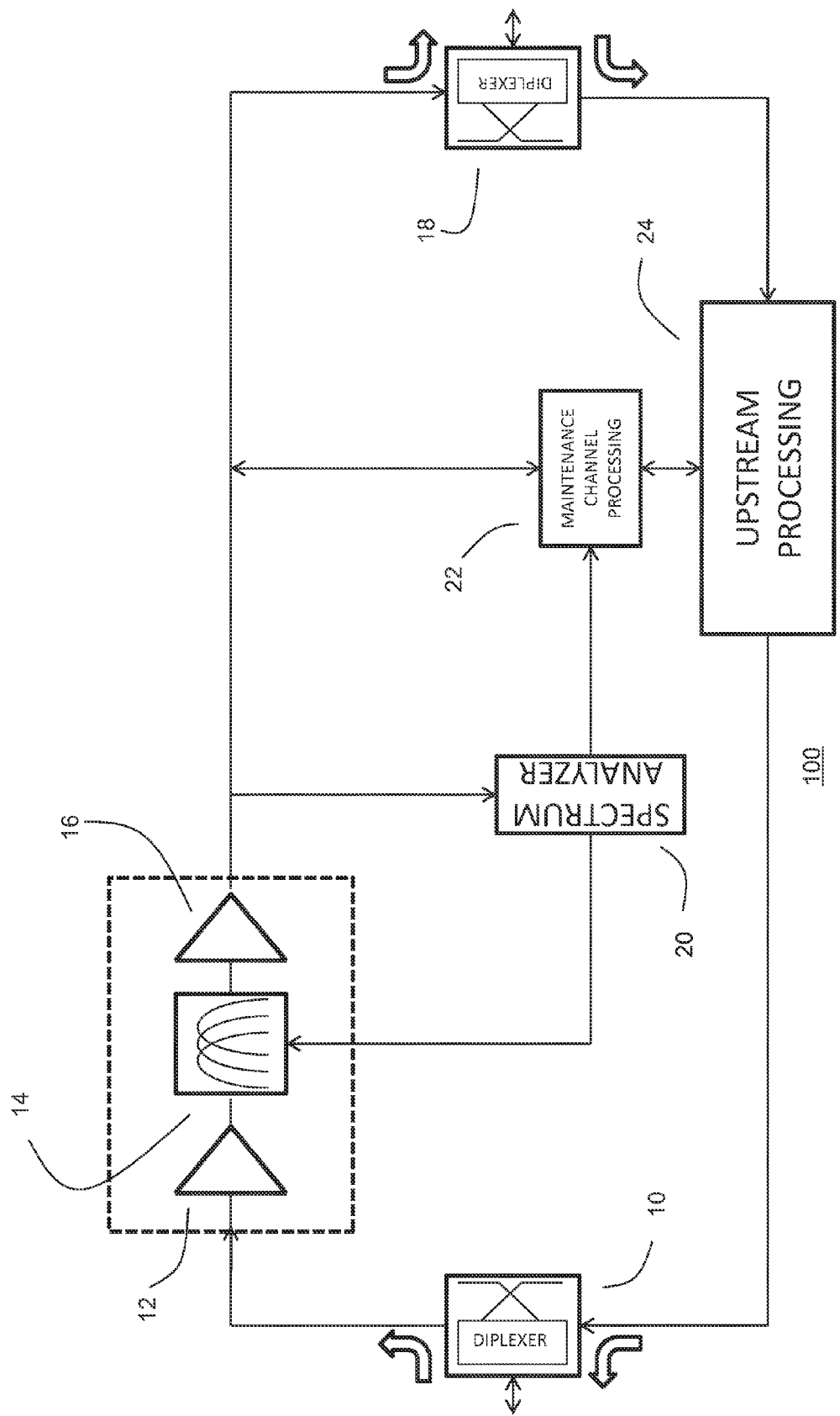
FIG. 1 shows a known repeater for a cable TV network.

FIG. 1 shows a known RF repeater 100 for a cable TV system. A first terminal of first diplexer 10 is connected to an input of a low noise amplifier 12. The output of the low noise amplifier 12 is connected to an equalizer 14. The output of the equalizer 14 is connected to the input of amplifier 16. The output of amplifier 16 is connected to a first terminal of a second diplexer 18. The output of amplifier 16 is connected to an input of a spectrum analyzer 20. The output of low noise amplifier 16 is connected to a first input of a maintenance channel processor 22. The amplifier 12, equalizer 14 and low noise amplifier 16 may form a signal conditioning circuit. A first output of the spectrum analyzer 20 is connected to a second input of maintenance channel processor 22. A second output of the spectrum analyzer 20 is connected to a control input of equalizer 14. The maintenance channel may be a dedicated channel for controlling the path from broadcaster to end customer. The maintenance channel processor 22 is connected to upstream processor 24. The upstream processor 24 may process the return path from customer to broadcaster, for example in internet applications. The first terminal of the first diplexer 10 is connected to maintenance channel processor 22. The first output of upstream processor 24 is connected to a second terminal of first diplexer 10. Upstream processor 24 is connected to a second terminal of second diplexer 18. RF signals from a cable television transmission may be received on an input connected to the third terminal of first diplexer 10. RF signals from a cable television transmission may be retransmitted on an output connected to the third terminal of second diplexer 18.

An incoming RF signal on third terminal of first diplexer 10 is routed through to the input of the low noise amplifier 12 and the spectrum analyzer 20. The spectrum analyzer 20 may control the behaviour of the equalizer 14 dependent on the content of the RF signal. The low noise amplifier 12, the equalizer 14, and the amplifier 16, together behave as a signal conditioner. The regenerated RF signal generated from the output of the amplifier 16 is transmitted to the further cable via the third terminal of the second diplexer 18. In cable TV applications, frequencies may range from between 40 MHz and 1.1 GHz. Any RF return signals are received at an input connected to the third terminal of diplexer 18. The return signals are routed to upstream processor 24 and then to the first diplexer 10. Return signals may be output from the third terminal of first diplexer 10.

Figure 2:
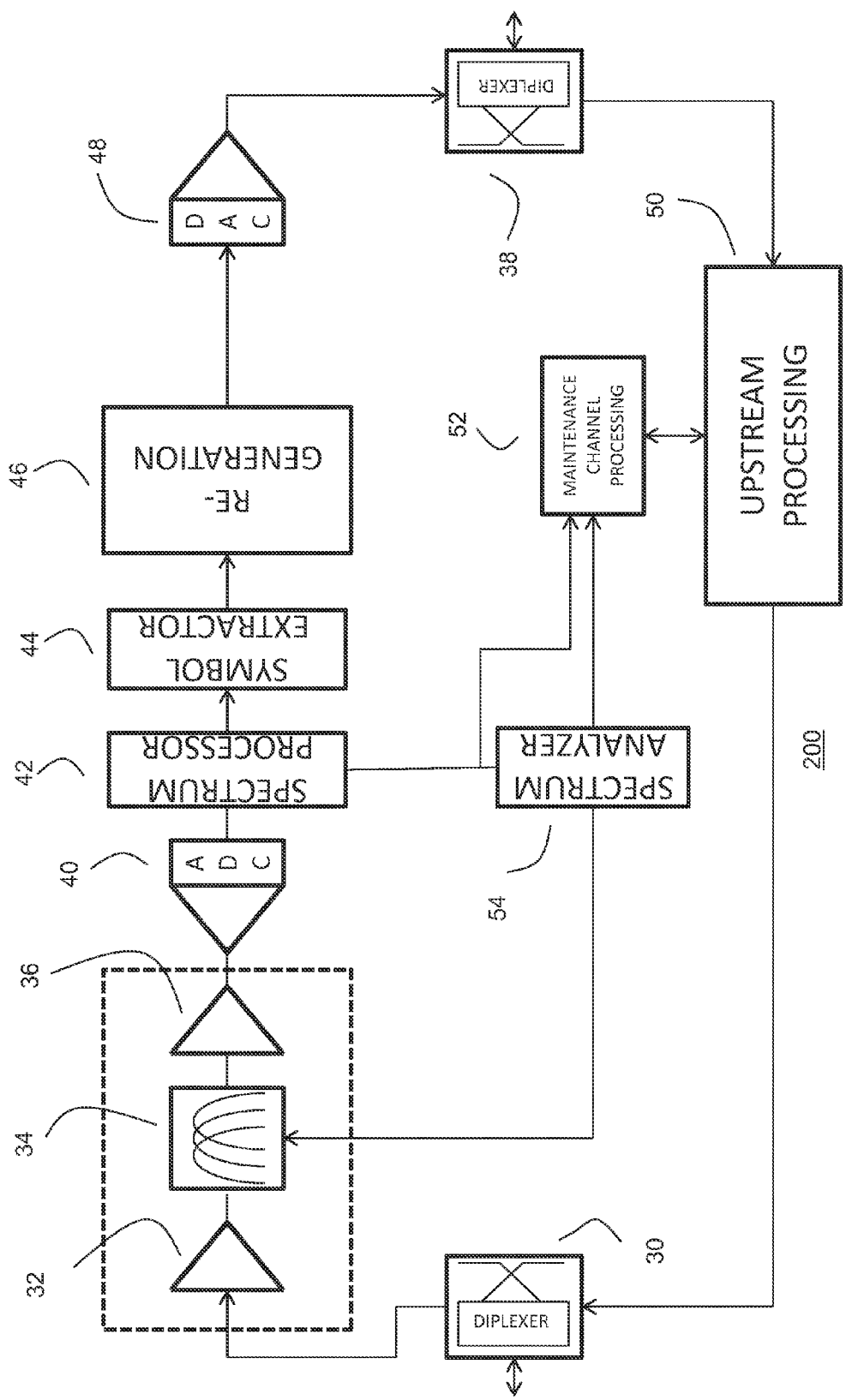
FIG. 2 illustrates a repeater for a cable TV network according to an embodiment.

FIG. 2 shows a RF repeater 200 for a cable TV system according to an embodiment. A first terminal of first diplexer 30 is connected to an input of a low noise amplifier 32. The output of the low noise amplifier 32 is connected to an equalizer 34. The output of equalizer 34 is connected to the input of an amplifier 36. The output of low noise amplifier 36 is connected to a first terminal of a second diplexer 38. The output of low noise amplifier 36 may be connected to an analog to digital convertor 40. The output of the analog to digital convertor 40 may be connected to spectrum processor 42. The output of Spectrum processor 42 may be connected to the input of modulation symbol extractor 44. The output of modulation symbol extractor 44 may be connected to the input of RF signal regenerator 46. The output of RF signal regenerator module 46 may be connected to an input of digital to analog convertor 48. The analog output of the digital to analog convertor 48 may be connected to a first terminal of second diplexer 38. A second terminal of diplexer 38 may be connected to upstream processor 50. A first output of upstream processor 50 may be connected to a second terminal of the first diplexer 30. Upstream processor 30 may also be connected to maintenance processor by a bidirectional signal. A second output of Spectrum processor 42 may be connected to an input of spectrum analyzer 54 and a first input of a maintenance channel processor 52. A first output of the spectrum analyzer 54 may be connected to a second input of maintenance channel processor 52. A second output of the spectrum analyzer 54 may be connected to a control input of the equalizer 34.

An RF signal carrying a multitude of channels may be received on the third terminal of the first diplexer 30. The channel information may be modulated on the carrier signal using a Quadrature Amplitude QAM modulation scheme. The channel bandwidth in this case may be approximately 1.2 times the symbol rate. For example, the digital transmission standard for cable television defined in Society of Cable Telecommunications Engineers standard ANSI/SCTE 07 2006 defines a channel bandwidth of 6 MHz and a symbol rate of 5.056941 Msps (+/−5 ppm) for a 64 QAM modulation and a channel bandwidth of 6 MHz and a symbol rate of 5.360537 Msps+/−5 ppm for a 256 QAM modulation. The RF signal maybe be routed to the input of the low noise amplifier 32 and through the equalizer 34 and amplifier 36. The low noise amplifier 32, equalizer 34 and amplifier 36 may condition the incoming RF signal to amplify and compensate for the high frequency tilt so that the signal will fit into the full range of the analog to digital converter 40 and thus take full advantage of the ADC resolution.

Analog to digital convertor 40 digitizes the QAM modulated RF signal. To digitize the full bandwidth in cable TV applications, the sample rate of the ADC may be greater than 2.2 GHz where the full spectrum has a bandwidth between 40 MHz and 1.1 GHz. The ADC may be a 10-bit ADC.

The spectrum of the digitized RF signal may then be processed by computing the Fourier transform of the signal using Spectrum processor 42. The number of points (Npts) of the Fourier transform may be adjusted according to the required frequency resolution. If no windowing operation is performed then for a sample frequency Fs, an Npts Fourier transform operation is equivalent to Npts Sin(x)/x filters each filter of bandwidth Fs/Npts placed every Fs/Npts.

If a window operation is used, the FFT of Npts points is equivalent to Npts filters each of bandwidth K*Fs/Npts placed every Fs/Npts, where K is a window bandwidth factor defined in units of number of Fourier transform output bins.

The Fourier transform of the window is a low-pass filter with cut off frequency $f_c$ denoted as $LPF(f_c,0)$. The windowing FFT behaves like a bank of filters, centered to any bin of the FFT; these filters are the LPF(fc,0) filter shifted around the FFT output bins. Now assuming that FFT is continuously operating, then an FFT output bin is running over time. The following maths demonstrate that any FFT bin over time may be equivalent to a channel located at that frequency translated in baseband.

Let x(t) denote the RF signal, X(f) denote the Fourier transform of x(t), w(t) denote the window signal and W(f) denote the Fourier transform of the window signal w(t).

Assume X is the sum of channels centred at $I \cdot f_c$ and with $f_c$ channel spacing, then:

$$X(f)=\Sigma A_i(f-I\cdot f_c) \text{ with } A_i(f)=0 \text{ for } f<f_c/2 \text{ and } f>f_c/2 \quad \text{(Equation 1)}$$

Assuming that a window is a low pass filter of bandwidth $f_c$:

$$W(f)=1 \text{ for } -f_c/2 \leq f \leq +f_c/2, 0 \text{ otherwise} \quad \text{(Equation 2)}$$

Assuming a continuous Fourier transform is run for a time u on signal x(t) windowed by w(t), then:

$$XW(u,f)=\text{Fourier}(x(t)\cdot w(t \cdot u))$$

$$XW(u,f)=X(f)*(W(f)\cdot\exp(-j\cdot 2\cdot\pi\cdot f\cdot u))$$

$$XW(u,f)=\int X(f-v)\cdot W(v)\cdot\exp(-j\cdot 2\cdot\pi\cdot v\cdot u)\cdot dv$$

$$XW(u,f)=\Sigma\int A_i(f-v-I\cdot f_c)\cdot W(v)\cdot\exp((-j\cdot 2\cdot\pi\cdot v\cdot u)\cdot dv$$

Now, considering any channel centre frequency $f=i\cdot f_c$ and noting that $XW(u,i\cdot f_c)=XW_i(u)$, then:

$$XW_i(u)=\Sigma\int A_i((i-I)^*f_c-v)\cdot W(v)\cdot\exp((-j\cdot 2\cdot\pi\cdot v\cdot u)\cdot dv$$

And according to equations (1) and (2) $XW_i(u)$ becomes:

$$XW_i(u)=\int A_i(-v)\cdot W(v)\cdot\exp(-j\cdot 2\cdot\pi\cdot v\cdot u)\cdot dv$$

$$XW_i(u)=\int A_i(v)\cdot W(v)\cdot\exp(j\cdot 2\cdot\pi\cdot v\cdot u)\cdot dv \quad \text{(Equation 3)}$$

Equation 3 is the inverse Fourier transform of channel i in baseband, i.e.:

$$XW_i(u)=A_i(u) \quad \text{(Equation 4)}$$

In the discrete time domain, the discrete Fourier transform (DFT) operation can be used. Let Npts denote the size of discrete Fourier transform, K denote the bandwidth of the window in number of Fourier transform bins, $T_s$ denote the sampling period and $F_s$ denote the sampling frequency, where $F_s=1/T_s$.

The frequency resolution of the DFT is:

$$f_r=1/(T_s\cdot\text{Npts})$$

Now, assuming that Ts, Npts are properly selected in order that $$K\cdot f_r=f_c$$

Then according to equation (3) the DFT bin located at frequency $i\cdot K\cdot f_r$ images channel i in baseband over time.

Note that:
a) The DFT should not be run every $T_s$ period as the channel bandwidth is limited to $f_c$.
b) The lowest rate for computing the DFT is $$1/f_c=1/(K\cdot f_r)=T_s\cdot\text{Npts}/K \quad \text{(Equation 5)}$$

c) According to equation (5) there must be at least K interleaved DFT operations.

The window may be applied to the digitized samples prior to FFT processing. The window bandwidth factor K depends on the type of window applied. Embodiments may use a Hanning window, a Hanning window or other window functions. The window increases the selectivity but at the cost of lower frequency resolution since the bandwidth is now $K^*F_s/$Npts. However, when the window bandwidth is close to the channel bandwidth then about 60 dB or 80 dB attenuation may be achieved resulting in better channel selectivity. Hence the number of sampling points Npts has to be adjusted according to the channel bandwidth (BWDchannel), and the window bandwidth (BWDwindow) according to the relationship $$\text{BWDchannel}=\text{BWDwindow}=K^*(F_s/\text{Npts})$$

Note that the Channel bandwidth BWDchannel is typically less than the channel frequency spacing $f_c$.

Following spectrum processing by Spectrum processor 42 all channels are available, together with central frequency and phase information for each channel. Symbol extractor 44 may compute the average amplitude and phase information and then to apply a correction to map the modulation vector onto the constellation diagram. The channel symbols may then be passed to a FIFO to compensate for any symbol rate fluctuation. By relocating the symbol correctly on the constellation, the noise factor of the channel may be improved by reducing the in-band channel noise which is not possible with analog processing. Following symbol extraction the symbols are input to the RF signal regenerator module 46. The regeneration module 46 may set the amplitude and phase of the central frequency. At that stage, some pre-equalization may be done by scaling higher amplitude signals. In case of continuous or sub-sampling processing, the regeneration module 46 may smooth the transition to the next symbol by some symbol shaping. The regeneration module 46 then applies an inverse FFT and outputs the data to digital to analog convertor 48. The output of digital to analog convertor 48 may be a regenerated modulated RF signal. The regenerated signal may be transmitted through the second diplexer 18.

Embodiments of the RF repeater may have a signal to noise ratio of 59 dB. Embodiments may not have an upstream channel or maintenance channel in which case maintenance channel processor 52 and upstream processor 50 may be omitted. In embodiments, one or more of the low noise amplifier 32, equalize 34 and amplifier 36 may be omitted dependent on what signal conditioning is required prior to the analog to digital convertor 40.

In embodiments the lowest FFT sample rate may be driven by the highest channel bandwidth and the channel bandwidth may be determined by the symbol rate. Spectrum processor 42 may have a sample frequency of twice the highest channel bandwidth.

Spectrum processor 42 may perform a FFT of 2048 points, at 32 MHz rate, assuming 512 channels, 8 MHz channel bandwidth, Windowing factor K of 4 FFT output bins and an oversampling channel of 4. 512*K=2048 & 8 MHz*4=32 MHz. Interleaved FFT may be used to achieve the higher processing rate. The output of Spectrum processor 42 may be a 12-bit output.

The repeater 200 can improve the noise factor of the signal compared to previous repeaters since symbols are extracted, rescaled, realigned, relocated on the constellation and then resent or retransmitted. This may result in an improvement on signal to noise ratio and bit error rate. Embodiments may use other modulation schemes such as phase shift keying.

Figure 3:
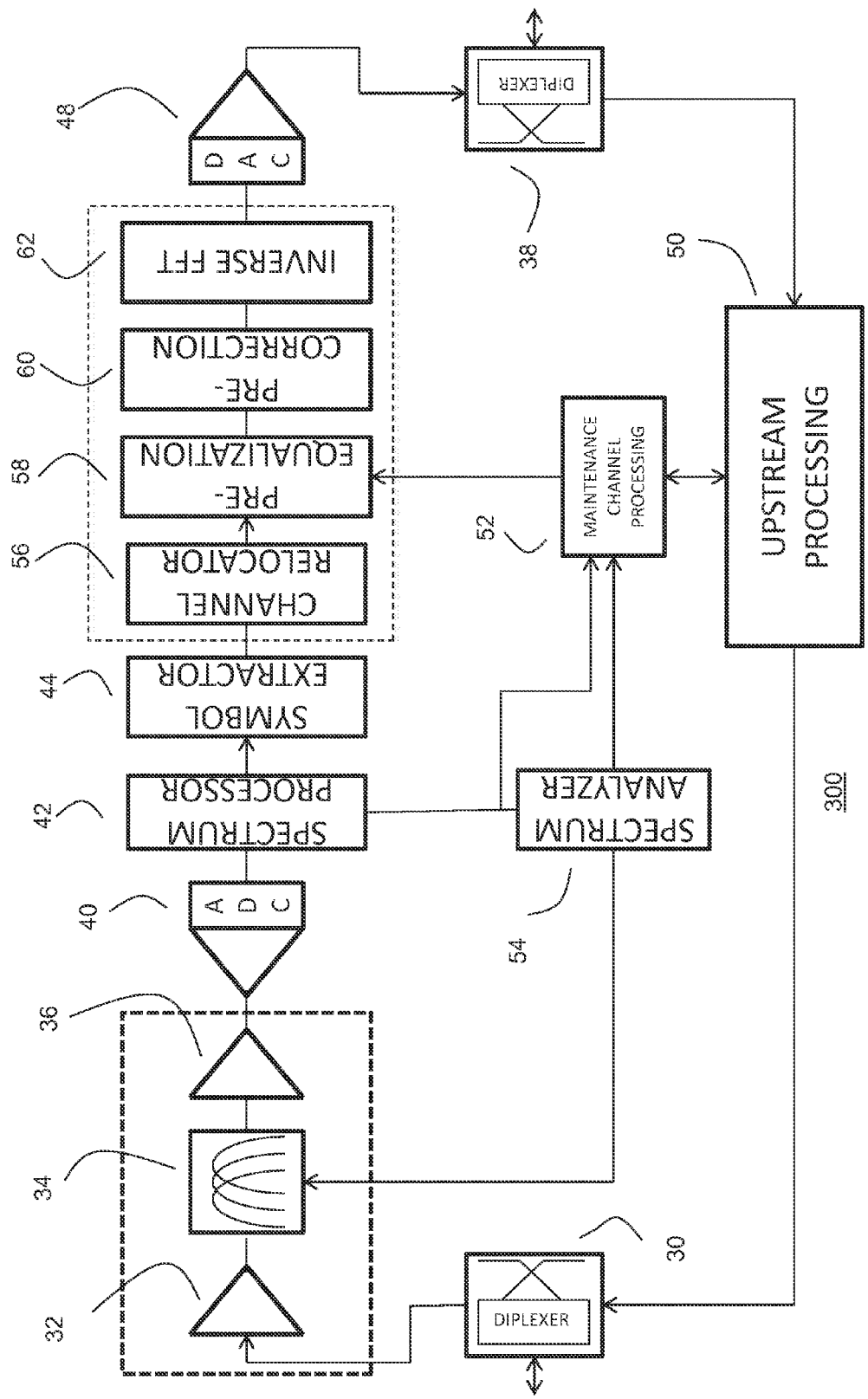
FIG. 3 shows a repeater for a cable TV network according to an embodiment.

FIG. 3 shows a RF repeater 300 for a cable TV system according to an embodiment. A first terminal of first diplexer 30 is connected to an input of a low noise amplifier 32. The output of low noise amplifier 32 is connected to equalizer 34. The output of equalizer 34 is connected to the input of an amplifier 36. The output of amplifier 36 is connected to a first terminal of a second diplexer 38. The output of amplifier 36 may be connected to an analog to digital convertor 40. The output of the analog to digital convertor 40 may be connected to Spectrum processor 42 for performing a fast Fourier transform operation. The output of Spectrum processor 42 may be connected to the input of modulation symbol extractor 44. The output of modulation symbol extractor 44 may be connected to the input of channel relocator 56. The output of channel relocator 56 may be connected to an input of pre-equalizer 58. An output of pre-equalizer 58 may be connected to an input of symbol corrector 60. An output of symbol corrector 60 may be connected to an input of inverse FFT module 62. An output of inverse FFT module 62 may be connected to an input of digital to analog convertor 48. The analog output of the digital to analog convertor 48 may be connected to a first terminal of second diplexer 38. A second terminal of diplexer 38 may be connected to upstream processor 50. A first output of upstream processor 50 may be connected to a second terminal of the first diplexer 30. The upstream processor 30 may also be connected to maintenance processor 52 by a bidirectional signal. A second output of Spectrum processor 42 may be connected to an input of spectrum analyzer 54 and a first input of maintenance channel processor 52. A first output of the spectrum analyzer 54 may be connected to a second input of maintenance channel processor 52. A second output of the spectrum analyzer 54 may be connected to a control input of the equalizer 34. An output of maintenance processor 52 may be connected to an input of a pre-equalizer 58.

The operation of repeater 300 is similar to the embodiment of FIG. 2. A received RF signal having channels of information modulated using a QAM scheme may be conditioned by amplifier 32, equalizer 34 and amplifier 36 before being digitized by analog to digital convertor 40. Following spectrum processing by Spectrum processor 42, the symbol extractor 44 may calculate the average amplitude and phase of the symbol and sets the amplitude and phase of the central frequency for each channel. The channel symbols can then be processed by the channel relocator 56 which may reallocate the channel to a new central frequency. The symbols may then be pre-equalized by pre-equalization module 46. Pre-equalization module 58 may compensate for the channel characteristics before retransmission from characteristics of the channel supplied to the maintenance module by either the Spectrum processor 42 or spectrum analyzer 54. If a feedback mechanism from a next repeater is enabled, which can be communicated via the upstream path to the maintenance processor 52, pre-equalization or adaptive equalization may be performed to improve the noise factor of the complete system. A reduced noise factor may allow either a longer transmit path for the same data rate or a higher rate for the same transmit path.

Correction module 60 may then apply a correction to compensate for the characteristics of the digital to analog convertor 48 before the symbols are converted back to the time domain by inverse FFT module 62 which effectively remodulates the channels. The data output from the inverse FFT module 62 may be output to the digital to analog convertor 48. The output of digital to analog convertor 48 is a regenerated RF signal. The regenerated signal may be transmitted through the second diplexer 18.

Figure 4:
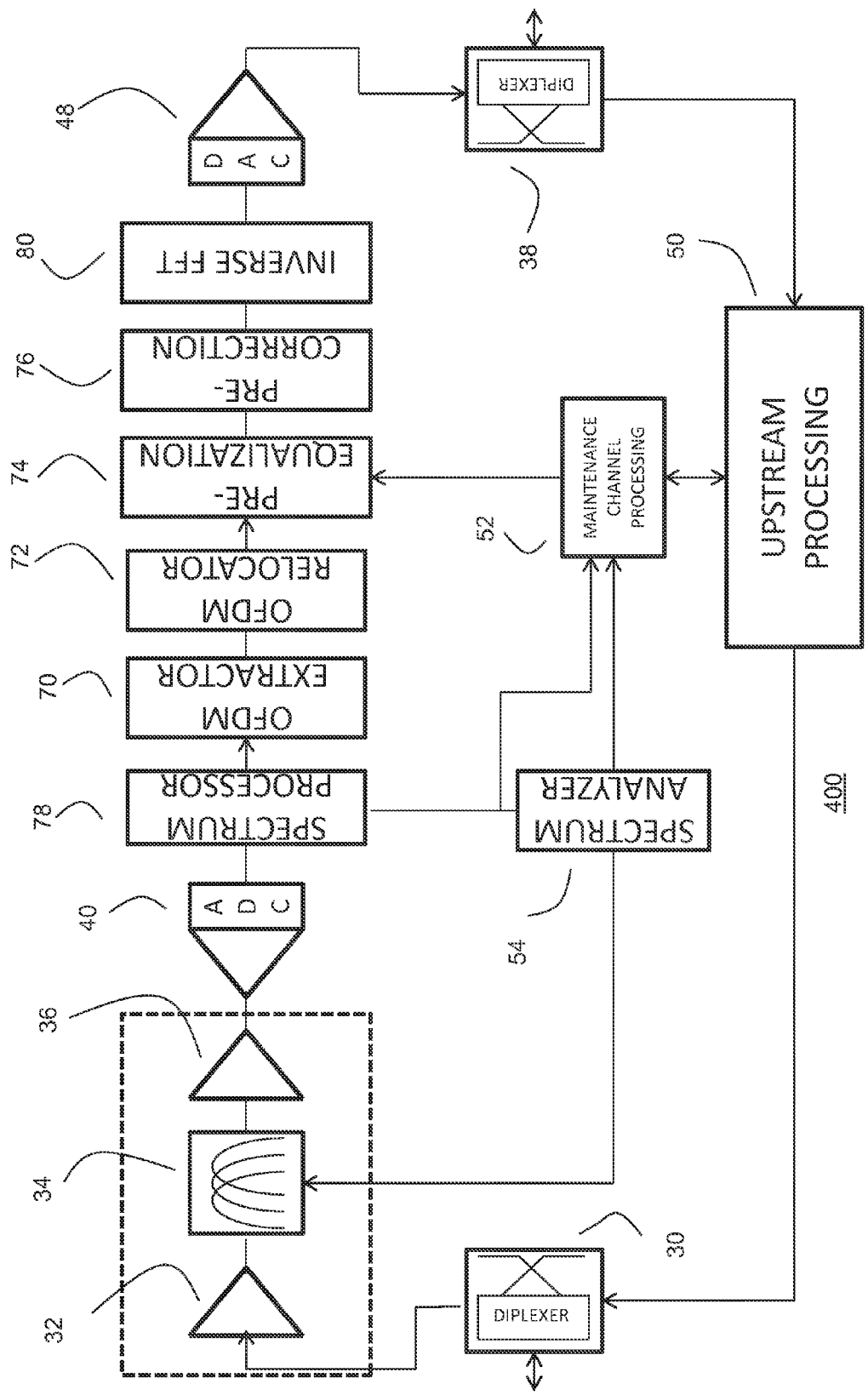
FIG. 4 illustrates a repeater for a system using an OFDM modulation scheme according to an embodiment.

FIG. 4 shows an example repeater for RF network using an OFDM modulation scheme 400. Repeater 400 may be used in a network for mobile communications for example mobile telephones. A first terminal of first diplexer 30 is connected to an input of a low noise amplifier 32. The output of low noise amplifier 32 is connected to equalizer 36. The output of equalizer 34 is connected to the input of amplifier 36. The output of low noise amplifier 36 is connected to a first terminal of a second diplexer 38. The output of an amplifier 36 may be connected to an analog to digital convertor 40. The output of the analog to digital convertor 40 may be connected to Spectrum processor 78 for performing a fast Fourier transform operation. The output of Spectrum processor 78 may be connected to the input of OFDM symbol extractor 70. The output of OFDM symbol extractor 70 may be connected to the input of OFDM channel relocator 72. The output of OFDM channel relocator 72 may be connected to an input of pre-equalizer 74. An output of pre-equalizer 74 may be connected to an input of OFDM corrector 76. An output of OFDM corrector 76 may be connected to an input of inverse FFT module 80. An output of inverse FFT module 80 may be connected to an input of digital to analog convertor 48. The analog output of the digital to analog convertor 48 may be connected to a first terminal of second diplexer 38. A second terminal of diplexer 38 may be connected to upstream processor 50. A first output of an upstream processor 50 may be connected to a second terminal of the first diplexer 30. The upstream processor 50 may also be connected to maintenance processor by a bidirectional signal. A second output of Spectrum processor 78 may be connected to an input of spectrum analyzer 54 and a first input of maintenance channel processor 52. A first output of the spectrum analyzer 54 may be connected to a second input of maintenance channel processor 52. A second output of the spectrum analyzer 54 may be connected to a control input of the equalizer 34. An output of maintenance processor may be connected to an input of pre-equalizer 74.

The operation of repeater 400 is as follows. A received RF signal having channels of information modulated using an OFDM scheme may be conditioned by amplifier 32, equalizer 34 and amplifier 36 before being digitized by analog to digital convertor 40. The spectrum is then computed by Spectrum processor 78 either by performing a global FFT dimension with sufficient resolution to separate the channels or by performing an extra sub FFT per channel. Following spectrum processing by Spectrum processor 78 the OFDM symbols are analyzed and extracted by OFDM extractor 70. OFDM extractor 70 may compute the average amplitude and phase information and map the modulation vector onto the constellation diagram for each sub-carrier. The channel symbols are input to the OFDM channel relocator 72, which may relocate one or more channels to a different central frequency. The symbol data may then be pre-equalized and symbol transition smoothed by pre-equalizer 74. Following pre-equalization the data maybe pre-distorted and reconstructed by reconstruction filter 76. Reconstruction filter 76 may apply a correction to compensate for the effect of the subsequent digital to analog conversion. The data may then be remodulated by converting back to the time domain by inverse FFT module 80 which then may output the data to digital to analog convertor 48. The output of digital to analog convertor 48 is a regenerated RF signal. The regenerated signal may be transmitted through the second diplexer 18.

Figure 5:
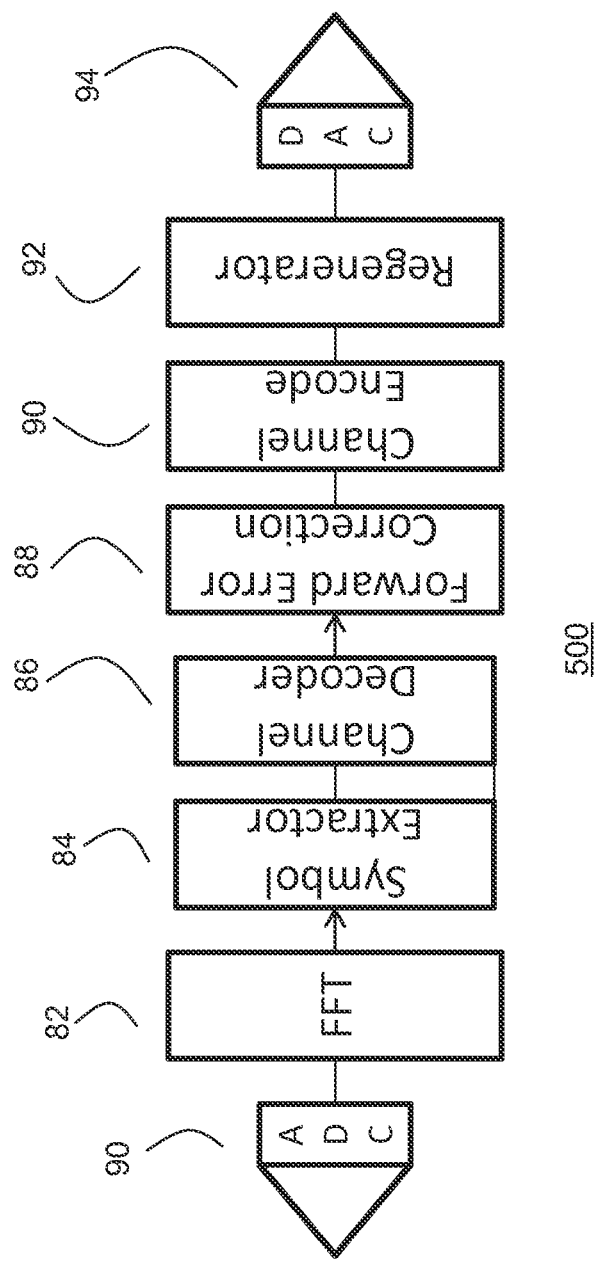
FIG. 5 illustrates a repeater with channel decoding and symbol error correction according to an embodiment.

Repeater 500 is shown in FIG. 5. The input of analog to digital convertor 90 may receive an RF signal modulated with information for a plurality of channels. The output of the analog to digital convertor 90 may be connected to Spectrum processor 82 for performing a fast Fourier transform operation. The output of Spectrum processor 82 may be connected to the input of symbol extractor 84 which may be an OFDM or QAM extractor dependent on the modulation scheme. The output of Spectrum processor 82 may be connected to the input of channel decoder 86 which may be for example a viterbi decoder. The output of channel decoder 86 may be connected to an input of forward error correction module 88. The output of forward error correction module 88 may be connected to channel encoder 90. The output of channel encoder 90 may be connected to RF signal regenerator 92. RF signal regenerator may reconstruct on OFDM signal and/or a QAM signal dependent on the modulation scheme used The output of RF signal generator 92 may be connected to the input of digital to analog convertor 94. In operation the output of digital to analog converter 94 may output a regenerated RF signal.

The repeater 500 performs full channel decoding, error correction and re-encoding which may further improve the signal to noise ratio and the bit error rate. In embodiments some channel symbols may be remodulated using different channels than used for the incoming RF signal, which may overcome problems in the downstream transmission.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. Embodiments may include any wireless network having repeaters.

Embodiments may include any wired or wireless RF transmission networks with RF repeaters. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A radio-frequency (RF) repeater for regenerating a received RF signal, the RF signal comprising a plurality of channels, each channel comprising a plurality of channel symbols, the radio-frequency repeater comprising:
   an input for receiving the received RF signal,
   an analog to digital convertor coupled to the input and configured to output a digitized RF signal,
   a spectrum processor coupled to the analog to digital convertor and configured to extract spectral information of each of the plurality of channels from the digitized RF signal,
   a channel symbol extraction module coupled to the spectrum processor and configured to extract one or more channel symbols from each of the plurality of channels, wherein the channel symbol extraction module is configured to apply a correction to an amplitude and to a phase of each channel symbol to locate the symbol correctly within a predefined symbol constellation without fully decoding the one or more channel symbols,
   an RF signal regenerator coupled to the channel symbol extraction module and configured to remodulate the one or more extracted channel symbols in each of the plurality of channels and output a digitized regenerated RF signal,
   a digital to analog convertor coupled to the RF signal regenerator and configured to convert the digitized regenerated RF signal to a regenerated RF signal for transmission,
   wherein the spectrum processor comprises a Fourier transform module, wherein the spectrum processor is arranged to process the spectrum of a RF signal comprising a plurality of channels modulated using one of a Quadrature Amplitude Modulation (QAM) a Phase Shift Keying (PSK) modulation or Orthogonal Frequency Division Multiplexing scheme, and the spectrum is processed by adjusting the number of points Npts of the Fourier transform using a window function with a window bandwidth factor K in units of the number of Fourier transform output bins according to the relationship K*(Sample frequency/Npts)=Channel bandwidth, wherein N and K are positive integers.

2. The RF repeater of claim 1, further comprising a signal conditioning circuit arranged in the signal path between the input and the analog to digital convertor, the signal conditioning circuit comprising an amplifier coupled to an equalizer.

3. The RF repeater of claim 1, wherein the spectrum processor comprises a Fourier transform module.

4. The RF repeater of claim 1, wherein the spectrum processor is configured to apply windowing to the digitized RF signal, and wherein the Window Bandwidth is equal to the Channel Bandwidth.

5. The RF repeater of claim 1, wherein the spectrum processor is arranged to process the spectrum of a RF signal comprising a plurality of channels modulated by OFDM modulation and the Fourier transform module is configured to apply a FFT operation on each sub carrier of the RF signal.

6. The RF repeater of claim 1, wherein the channel symbol extraction module is configured to calculate an average amplitude and phase of the plurality of channel symbols.

7. The RF repeater of claim 1, wherein the RF signal regenerator further comprises a channel relocator configured to set an amplitude and phase of the central frequency for each channel and to scale the amplitude of each of the plurality of channels.

8. The RF repeater of claim 1, wherein the RF signal regenerator further comprises an Inverse Fourier Transform Module.

9. The RF repeater of claim 8, wherein the RF signal regenerator further comprises a correction module arranged between the inverse fourier transform module and the analog to digital convertor, wherein the correction module is configured to alter a phase and/or amplitude of each channel symbol.

10. The RF repeater of claim 1, wherein the RF signal regenerator comprises a channel decoder coupled to the channel symbol extraction module, a forward error correction module coupled to the channel decoder, a channel encoder coupled to the forward error correction module and a channel relocator coupled to the channel encoder, wherein the RF signal regenerator module is further configured to perform error correction on each channel symbol.

11. A method of regenerating a received radio-frequency (RF) signal, the RF signal comprising a plurality of channels, each channel comprising a plurality of channel symbols, the method comprising:
producing a digitized RF signal from the received RF signal,
extracting spectral information of each of the channels from the digitized RF signal using a spectrum processor,
extracting one or more channel symbols from each of the plurality of channels, wherein extracting the one or more channel symbols from each of the plurality of channels comprises applying a correction to an amplitude and to a phase of each channel symbol to locate the symbol correctly within a predefined symbol constellation without fully decoding the one or more channel symbols,
remodulating the channel symbols, and
converting the remodulated channel symbols to an analog signal resulting in a regenerated RF signal,
wherein extracting the spectral information of each of the channels from the digitized RF signal using the spectrum processor comprises processing the spectrum of the digitized RF signal by adjusting the number of points Npts of a Fourier transform using a window function with a window bandwidth factor K in units of the number of Fourier transform output bins according to the relationship K*(Sample frequency/Npts)=Channel bandwidth, wherein N and K are positive integers.

12. The method of claim 11 further comprising scaling an amplitude of a central frequency for each channel prior to remodulating the channel symbols.

* * * * *